April 7, 1953 G. S. CARBONNEAU 2,634,133

RECORD SPEED ADAPTER

Filed March 29, 1949

INVENTOR.
Gordon S. Carbonneau
BY
Otis A. Earl

Patented Apr. 7, 1953 2,634,133

UNITED STATES PATENT OFFICE 2,634,133

RECORD SPEED ADAPTER

Gordon S. Carbonneau, Grand Rapids, Mich., assignor to Carbonneau Industries, Inc., Grand Rapids, Mich.

Application March 29, 1949, Serial No. 84,151

6 Claims. (Cl. 274—9)

This invention relates to certain improvements in a record speed adapter such as is disclosed and claimed in the co-pending application of Arthur H. Thompson, Serial No. 84,108, filed March 29, 1949, now Patent No. 2,562,245.

The principal objects of this invention are:

First, to provide a record speed adapter which will permit the playing of records having a wide variety of non-standard speed characteristics on a standard phonograph regardless of the type of pickup mechanism with which the phonograph is supplied.

Second, to provide a record speed adapter having an auxiliary pickup arm which is easily connectable to the regular pickup arm of a phonograph on which the adapter is placed.

Third, to provide a record speed adapter having novel mechanism for varying the speed ratio between the turntable of a phonograph and a record driven by the adapter.

Fourth, to provide a novel form of connector in combination with an auxiliary pickup arm which connector is particularly adapted for easy connection to the type of crystal pickup commonly used on phonographs.

Other objects and advantages relating to details of my invention will be apparent from a consideration of the following description and claims. The drawings of which there is one sheet illustrates a preferred form of my invention.

Figures 1, 2, 3:
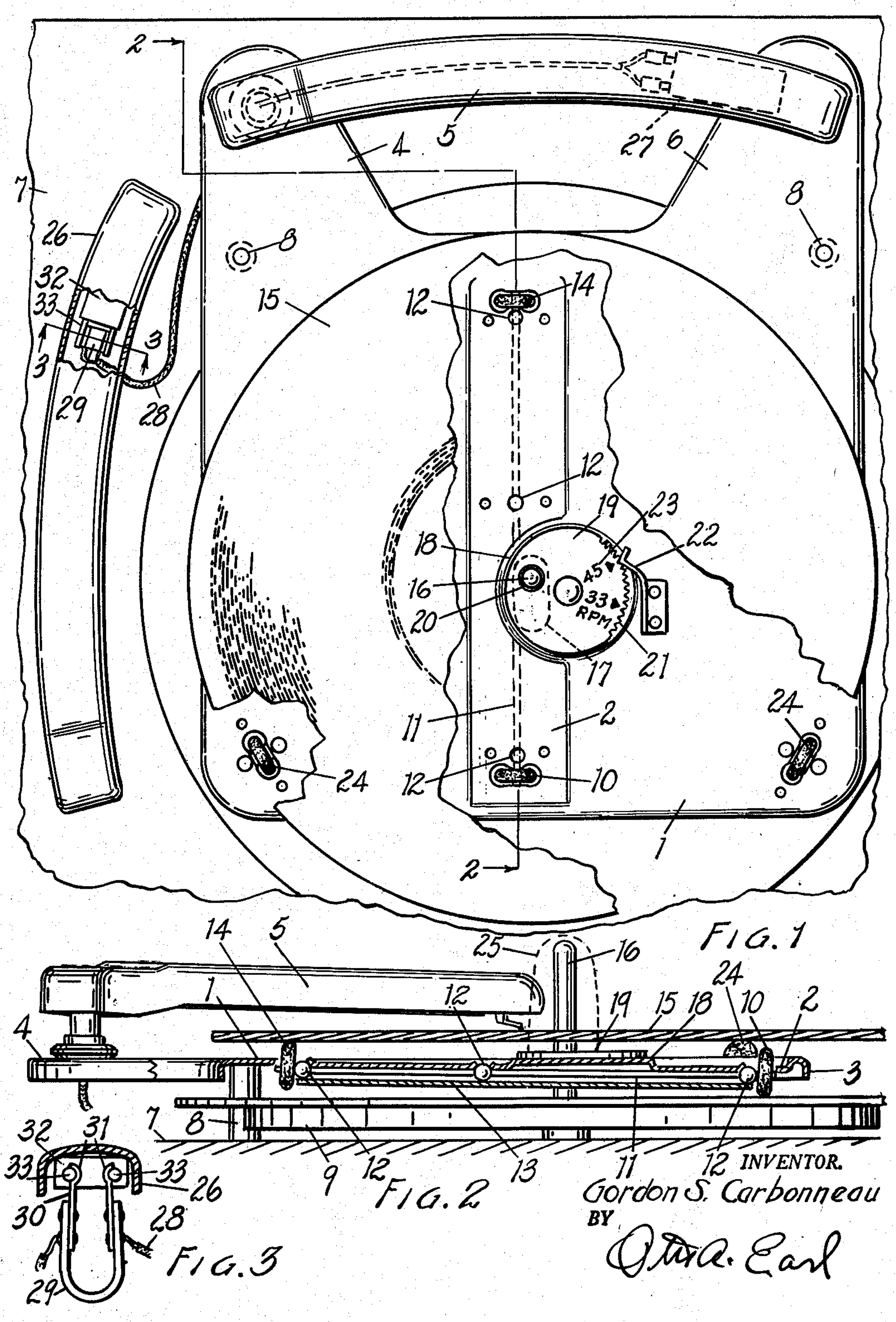
Fig. 1 is a fragmentary plan view of a phonograph turntable and pickup arm with my record speed adapter mounted on the turntable, portions of the pickup arm and a record on the adapter being broken away.
Fig. 2 is a fragmentary vertical cross sectional view through the adapter taken along the broken line 2—2 in Fig. 1.
Fig. 3 is an enlarged vertical cross sectional view through the phonograph pickup taken along the line 3—3 in Fig. 1.

My adapter consists of a plate-like body member 1 having a depressed and inclined center portion 2 and a downturned peripheral rim 3. One corner of the body member 1 is provided with an arm-like extension 4 which pivotally supports an auxiliary pickup arm 5. The adjacent corner of the body has a similar arm 6 which serves as a rest for the pickup arm 5 when it is not in use. The side of the adapter on which the arms 4 and 6 are formed is arranged to be supported from the top panel 7 of any standard phonograph by the legs 8.

The side of the body panel 1 opposite the legs 8 is supported on the turntable 9 of a phonograph by the driving wheel 10. The driving wheel 10 is rotatably mounted on the inclined portion 2 of the body by means of a shaft 11 carried in the self-aligning ball shaped bearings 12. The bearings are retained against the edges of apertures in the inclined portion by means of a retaining strip 13 secured to the underside of the body panel.

The shaft 11 which is inclined relative to the main portion of the body panel 1 is provided with a driven wheel 14 at its upper end and it will be noted that the wheels 10 and 14 project through slots provided therefore in the inclined portion of the body panel. The driving and driven wheels function to support the adapter on the turntable and drive a record 15 on the adapter at a different speed than the turntable in the manner more particularly described and claimed in the above mentioned application of Arthur H. Thompson.

In order to locate my adapter relative to the centering pin 16 of the phonograph, I have provided an elongated slot 17 in the body panel 1 closely adjacent to a vertical plane through the shaft 11. It will be noted from Figs. 1 and 2 that the inclined portion 2 is notched or broken around the slot 17 so that the slot is formed in a projection 18 of the body panel which is approximately level with the main portion of the body panel. Rotatably mounted on the projection 18 is a flat disk 19 which overlies the slot 17 and defines a hole 20 which registers with the slot. Thus the centering pin 16 of the phonograph can be projected upwardly through the slot and hole to locate the adapter relative to the phonograph turntable.

It will be appreciated that as the disk 19 is rotated on its pivot the hole 20 will move substantially longitudinally of the axis of the shaft 11 thus changing the ratio of the distances from the centering pin to the driving and driven wheels. The speed ratio between the turntable 9 and the driven record 15 can thus be varied considerably and I have provided a series of notches or serrations 21 on the edge of the disk 19 which are cooperative with a spring lock 22 secured to the body panel to fix the position of the disk and the hole 20 in any adjusted position of the disk. Indicium 23 on the disk may indicate the speed at which a record on the adapter will turn when the adapter is applied to a standard 78 R. P. M. record.

The record 15 is supported on one side by the driven wheel 14 and at at least two other points by idler wheels 24 rotatably mounted on the body panel 1. The record is centered with respect to the adapter by fitting the record over the center pin 16 of the phonograph. In cases where the records to be played have non-standard or oversize holes an adapter thimble or spool can be fitted over the pin 16 as indicated by the dotted line at 25 in Fig. 2.

Since the pickup arms and mechanism of many standard phonographs such as that indicated at 26 are not properly balanced or provided with suitable needles for coaction with non-standard speed records, I have provided the auxiliary pickup arm 5 directly mounted on the adapter as previously described. The auxiliary arm 5 is provided with a suitably designed crystal pickup 27 and needle and is properly balanced to provide the right needle pressure. The pickup 27 is provided with a cable 28 extending to a U-shaped spring clip 29 (see Fig. 3). The spring clip 29 is preferably made of springable plastic material because of the insulating properties of the plastic and the arms of the clip are provided with contacts 30 having the projecting U-shaped tips 31 formed on the ends thereof. The conductors of the cable 28 are electrically connected to the contacts 30 by the same rivets that secure the contacts to the clip.

Since most standard phonograph pickup arms 26 are provided with a standard crystal pickup 32 having a pair of terminals 33 projecting therefrom, my clip 29 and contacts 30 are easily engaged with or disengaged from the terminals 33 by simply snapping the clip between the terminals. Thus the user of my adapter has merely to set the disk 19 to the proper position corresponding to the type of record he wishes to play and place the adapter on the turntable of the standard phonograph with the pin 16 projecting through the hole 20. The user can then snap the clip 29 on the standard pickup arm 26 and the adapter is ready to operate with the electrical impulses created by the auxiliary pickup 27 being transmitted and amplified directly through the circuits already provided in the phonograph.

Having thus described my invention, what I claim as new and desire to secure by Letters Patent is:

1. A record speed adapter for a phonograph comprising a plate-like body member having a pair of supports mounted on one side thereof, a shaft rotatably mounted on said body member and extending obliquely to and terminating at one end short of a line between said supports, a driving wheel secured to the end of said shaft remote from the line of said supports and projecting below said body member for drivingly engaging the turntable of a phonograph, a driven wheel secured to the opposite end of said shaft to support and drive a record to be played, said body having an opening therethrough extending closely adjacent to and longitudinally of said shaft, an adjusting disk pivotally secured to said body member and overlying said opening, said disk having notches along its periphery and a pin receiving hole formed therein registering with and translatable along said opening, spring pressed lock means on said body member engageable with said notches in said disk to hold said disk in adjusted position, idler wheels mounted on said body member and rotatable about axes converging toward said hole, an auxiliary pickup arm pivotally supported on said body member, said auxiliary arm having pickup mechanism and balance characteristics adapted to cooperate with said record to be played and having a connecting cable with conductors extending from the pickup mechanism therein, and a U-shaped springable clip having contacts secured to the arms thereof and connected to the conductors of said cable, said clip being attachable to terminals of the pickup mechanism of a phonograph.

2. A record speed adapter for a phonograph comprising a plate-like body member having means forming a line support mounted on one side thereof, a shaft rotatably mounted on said body member and extending obliquely to and terminating short of the line of said support, a driving wheel secured to the end of said shaft remote from said support and projecting below said body member for drivingly engaging the turntable of a phonograph, a driven wheel secured to the opposite end of said shaft to support and drive a record to be played, said body having an opening therethrough extending closely adjacent to and longitudinally of said shaft, an adjusting member movably secured to said body member and overlying said opening, said adjusting member having a pin receiving hole formed therein registering with and translatable along said opening, lock means on said body member engageable with said adjusting member to hold said adjusting member in adjusted position, idler wheels mounted on said body member and rotatable about axes converging toward said hole, an auxiliary pickup arm pivotally supported on said body member, said auxiliary arm having pickup mechanism and balance characteristics adapted to cooperate with said record to be played and having a connecting cable with conductors extending from the pickup mechanism therein, a U-shaped springable clip having contacts secured to the arms thereof and connected to the conductors of said cable, said clip being attachable to terminals of the pickup mechanism of a phonograph.

3. A record speed adapter for a phonograph comprising a plate-like body member having means forming a line support on one side thereof, a shaft rotatably mounted on said body member and extending obliquely to and terminating at one end short of the line of said support, a driving wheel secured to the end of said shaft remote from said support and projecting below said body member for drivingly engaging the turntable of a phonograph, a driven wheel secured to the opposite end of said shaft to support and drive a record to be played, said body having an opening therethrough extending closely adjacent to and longitudinally of said shaft, an adjusting disk pivotally secured to said body member and overlying said opening, said disk having notches along its periphery and a pin receiving hole formed therein registering with and translatable along said opening, spring pressed lock means on said body member engageable with said notches in said disk to hold said disk in adjusted position, idler wheels mounted on said body member and rotatable about axes converging toward said hole, and an auxiliary pickup arm pivotally supported on said body member, said auxiliary arm having pickup mechanism and balance characteristics adapted to cooperate with said record to be played and having a connecting cable extending from the pickup mechanism therein for connecting said auxiliary pickup to the pickup mechanism of a phonograph.

4. A record speed adapter for a phonograph comprising a plate-like body member having means forming a line support on one side thereof, a shaft rotatably mounted on said body member and extending obliquely to and terminating at one end short of the line of said support, a driving wheel secured to the end of said shaft remote from said support and projecting below said body member for drivingly engaging the turntable of a phonograph, a driven wheel secured to the opposite end of said shaft to support and drive a record to be played, said body having an opening therethrough extending closely adjacent to and longitudinally of said shaft, an adjusting disk pivotally secured to said body member and overlying said opening, said disk having notches along its periphery and a pin receiving hole formed therein registering with and translatable along said opening, and spring pressed lock means on said body member engageable with said notches in said disk to hold said disk in adjusted position.

5. A record speed adapter for a phonograph comprising a body member having a support on one side thereof, a shaft rotatably mounted on said body member, a driving wheel secured to one end of said shaft and remote from said support and projecting below said body member for drivingly engaging the turntable of a phonograph, a driven wheel secured to the opposite end of said shaft and projecting above said body member to support and drive a record to be played, said body having an opening therethrough extending closely adjacent to and longitudinally of said shaft, an adjusting disk pivotally secured to said body member and overlying said opening, said disk having notches along its periphery and a pin receiving hole formed therein registering with and translatable along said opening, and spring pressed lock means on said body member engageable with said notches in said disk to hold said disk in adjusted position.

6. A record speed adapter for a phonograph comprising a body member having means forming a line support on one side thereof, a shaft rotatably mounted on said body member and extending obliquely to and terminating at one end short of the line of said support, a driving wheel secured to the end of said shaft remote from said support and projecting below said body member for drivingly engaging the turntable of a phonograph, a driven wheel secured to the opposite end of said shaft and projecting above said body member to support and drive a record to be played, said body having an opening therethrough extending closely adjacent to and longitudinally of said shaft, an adjusting member movably secured to said body member and overlying said opening, said adjusting member having a pin receiving hole formed therein registering with and translatable along said opening, and means to hold said adjusting member in adjusted position.

GORDON S. CARBONNEAU.

REFERENCES CITED

The following references are of record in the file of this patent:

UNITED STATES PATENTS

| Number | Name | Date |
|---|---|---|
| 565,046 | Stromberg et al. | Aug. 4, 1896 |
| 1,384,357 | Wills | July 12, 1921 |
| 1,573,309 | Dowey | Feb. 16, 1926 |
| 1,811,003 | Eftihios | June 23, 1931 |
| 1,859,423 | Arnold | May 24, 1932 |
| 2,051,819 | Carson | Aug. 25, 1936 |
| 2,241,013 | Gay | May 6, 1941 |
| 2,529,019 | Hardy | Nov. 7, 1950 |

FOREIGN PATENTS

| Number | Country | Date |
|---|---|---|
| 340,905 | Great Britain | Jan. 8, 1931 |